Aug. 24, 1937.  F. N. BARD  2,090,743
PLUG VALVE
Filed Sept. 8, 1930  3 Sheets-Sheet 1
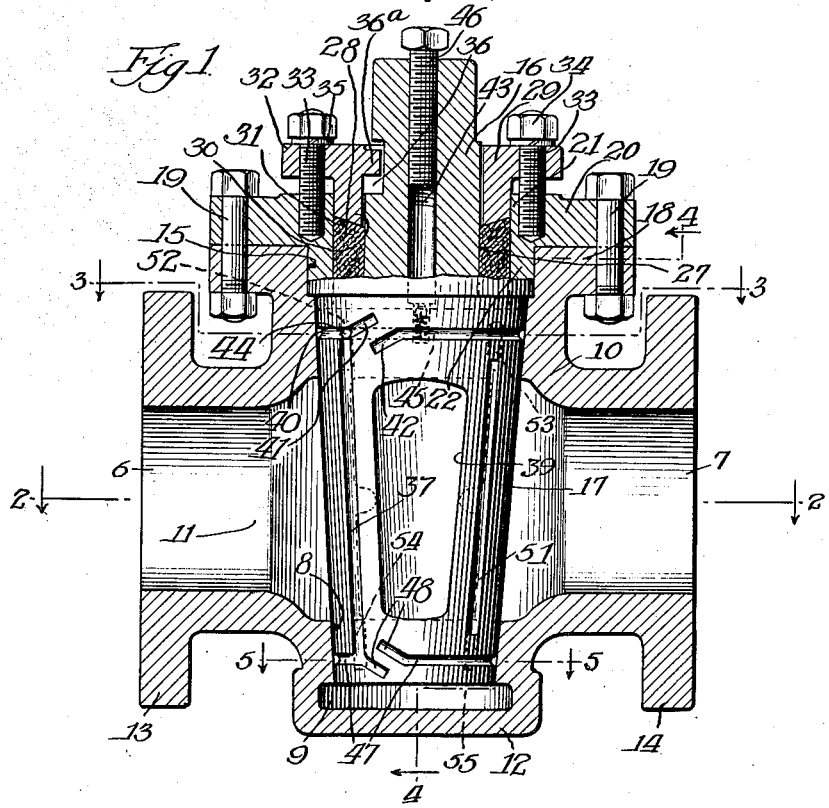
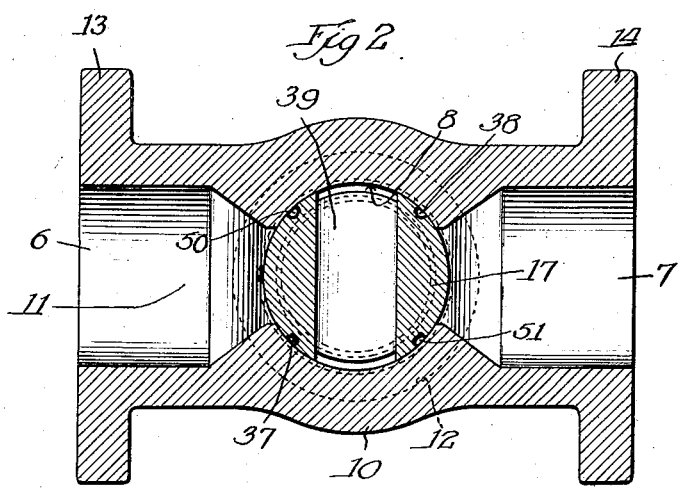
Witness:
R. B. Davison
Inventor:
Francis Norwood Bard
By attorney
Paul Carpenter Aug. 24, 1937. F. N. BARD 2,090,743
PLUG VALVE
Filed Sept. 8, 1930 3 Sheets-Sheet 2
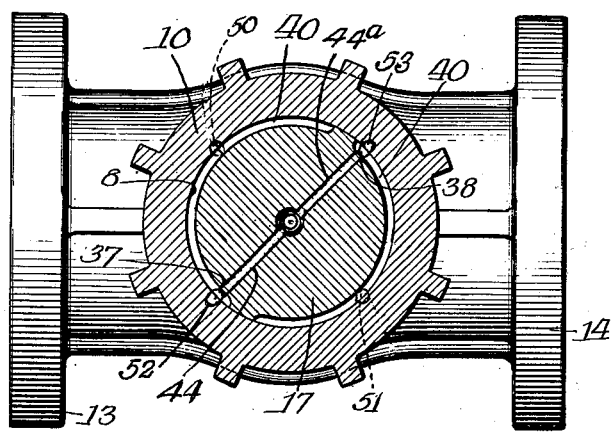
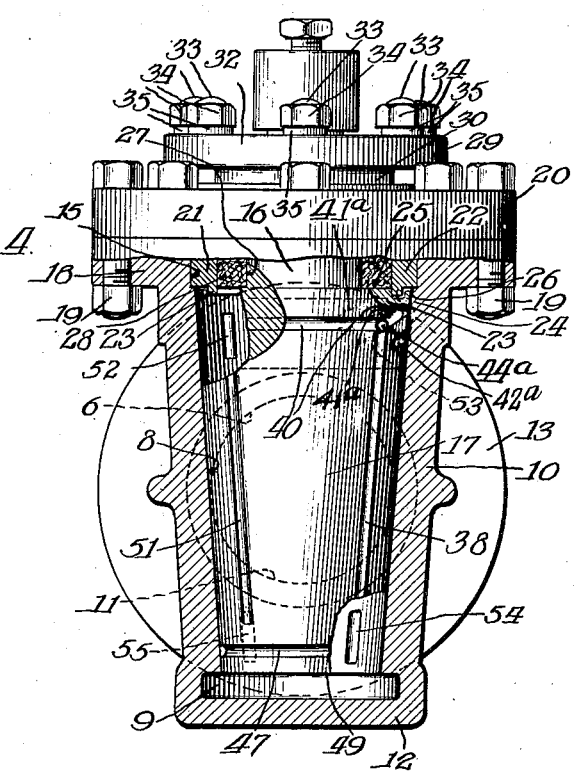
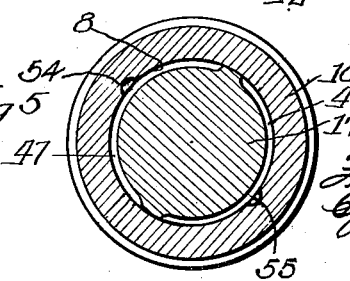

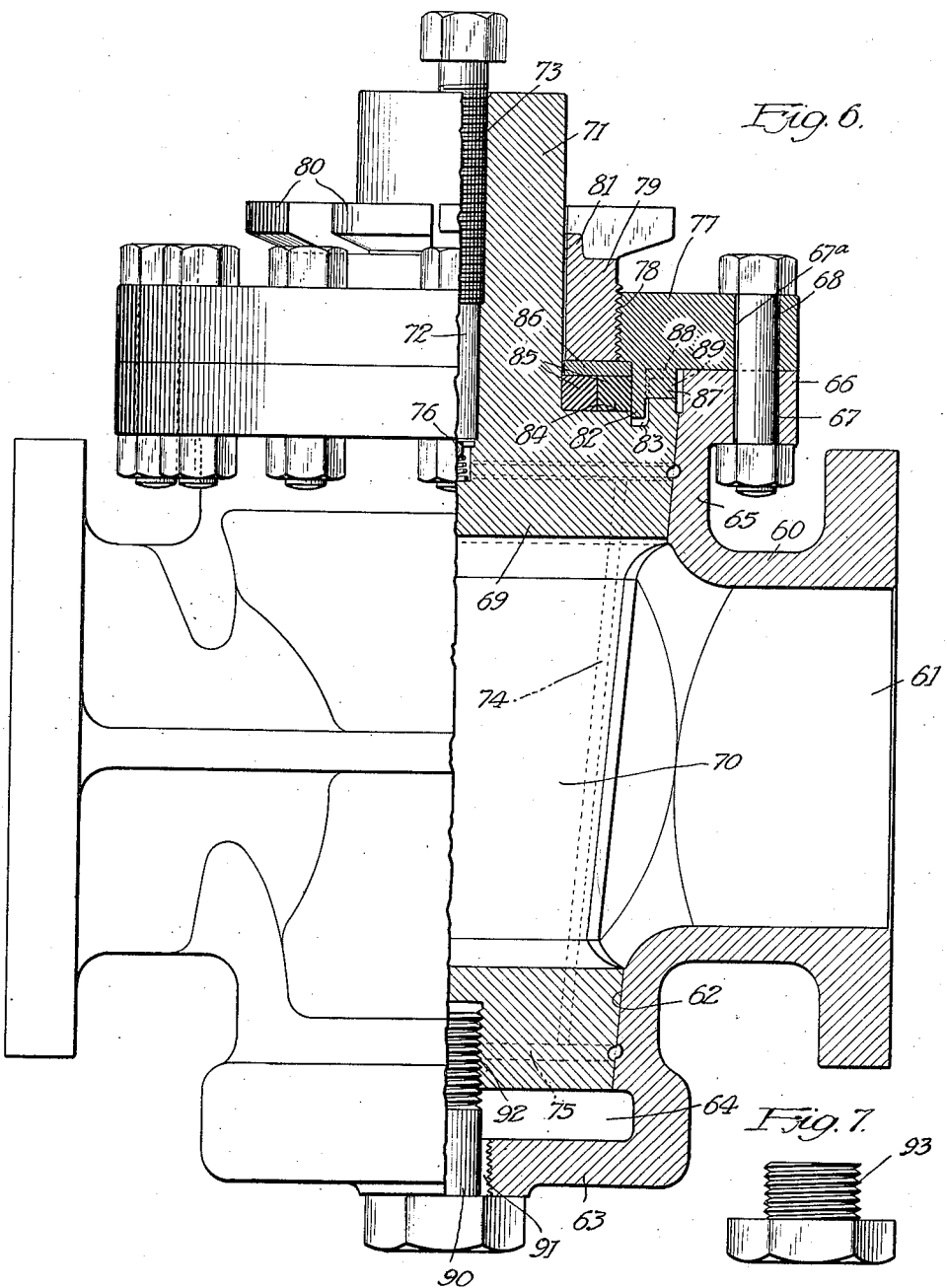

Patented Aug. 24, 1937

2,090,743

UNITED STATES PATENT OFFICE 2,090,743

PLUG VALVE

Francis Norwood Bard, Highland Park, Ill., assignor to Walworth Patents Inc., Boston, Mass., a corporation of Massachusetts Application September 8, 1930, Serial No. 480,288

35 Claims. (Cl. 251—93)

This invention relates in general to valves, and more particularly to that type of valve known as a rotating plug valve, this invention having special reference to improvements in means for supplying a lubricant to the surface of contact between the valve member and its seat and to improvements in packing for the valve stem.

While this invention is described and illustrated as incorporated in both of its phases in a plug valve, it will be understood that certain features of the invention may be employed for analogous structures, and that the invention therefore finds a wide field of utility.

It is well known to those skilled in the art that in a valve of the rotating plug type, the valve member is generally tapering in configuration and maintained in its seat of substantially the same configuration under tension, either of a spring member at one end of the valve or by positive means holding the valve member on its seat. In the latter case, the means for holding the valve member on its seat must be backed off when it is desired to introduce a lubricant between the seating surface of the valve member and its seat, and such an arrangement is, therefore, undesirable from certain aspects.

The present invention includes, as one of its principal objects, the provision of a plug valve of the rotating plug type wherein the valve member is yieldingly maintained on its seat by the provision of an improved form of resilient packing which permits the valve member to lift or move from its seat when lubricant is forced under pressure to the seating surface and to thereby eliminate the provision of separate spring elements for holding the valve member on its seat, the packing performing the functions of shutting off leakage of the valve when on and off its seat and of tending to hold the valve member on its seat in its normal operation.

This invention has for further objects the provision of an improved arrangement of lubricant conduits or grooves in the seating surface for conducting lubricant quickly and conveniently to the entire seating surface; the provision of an improved arrangement of lubricant grooves wherein lubricant contained in a major portion of the groove is maintained out of contact with the fluid in the pipe line; the provision of improved arrangement of lubricant grooves which offer a number of paths for distributing the lubricant and thus rendering it unnecessary to manipulate the valve member repeatedly in order to distribute the lubricant over the seating surface; and the provision of an arrangement of control of lubricant feed to the grooves so that when the valve member is in intermediate positions between full-open and full-closed positions, those of the grooves which come into contact with the fluid in the pipe line are disconnected from the lubricant supply so that all the lubricant does not flow off into the pipe line and thus become lost.

This invention further contemplates the provision of an improved packing for valves, and the like, wherein the packing may be removed, replaced or added to without removing the plug from its casing and while pressure is still on the line and without any danger of the plug blowing out of the casing; the provision of an improved retaining ring structure for holding packing for valves and the like in position, and the provision of an improved packing and arrangement of lubricant grooves wherein the packing resists the lifting of the valve member off its seat under the pressure of lubricant in the grooves and thereby cooperates with the groove arrangement to cause a thin film of lubricant to be introduced over the entire seating surface.

The foregoing and such other objects and advantages as may appear or be pointed out as this description proceeds are attained in the structural embodiment of the invention as described and claimed in the accompanying drawings, in which:

Figure 1 is a vertical sectional view taken through a valve incorporating the improvements of this invention;

Figure 2 is a horizontal sectional view, taken on the line 2—2 of Figure 1 looking in the direction indicated by the arrows;

Figure 3 is a view similar to Figure 2, taken on the line 3—3 of Figure 1, looking in the direction indicated by the arrows;

Figure 4 is a vertical sectional view, taken on the line 4—4 of Figure 1, looking in the direction indicated by the arrows;

Figure 5 is a horizontal sectional view, taken on the line 5—5 of Figure 1 looking in the direction indicated by the arrows, and Figure 6 is a partly elevational and partly longitudinal sectional view of a valve incorporating an alternative form of this invention, and Fig. 7 is a view of a detail.

Referring now more particularly to the drawings, I provide a valve casing 10 having a fluid passageway 11 divided into the parts 6 and 7 by the transverse valve seat 8. The valve seat 8 is of tapering configuration and extends to and communicates with a pocket 9 formed by a wall 12. The ends of the casing 10, that is, adjacent the portions 6 and 7 of the fluid passageway 11, are provided with annular flanges 13, 14 by which the valve may be bolted into a pipe line.

The upper end of the valve seat 8 in Figures 1 and 4 communicates with an opening 15 through which the reduced stem portion 16 of the valve member 17 projects. The valve member 17 is frusto-conical in shape, corresponding to the valve seat 8, and is inserted into the casing through the opening 15, it being, of course, necessary that this opening be provided in order that the valve member may be conveniently introduced into the casing.

Bordering the opening 15, I provide an annular flange 18 suitably apertured to receive the retaining bolts 19, 19, these bolts 19 passing through the annular flange 20 of a valve retaining member 21, whose inner peripheral bottom edge is provided with an annular inwardly directed flange 22, said flange being reduced to form an annular tongue 23 which enters an annular groove 24 in the end piece 25 of the valve member 17. The tongue 23 is of a dimension less than that of the groove 24, and the surface of the valve member, indicated at 25 where it underlies the flange 22, is spaced therefrom, as indicated at 26, so as to permit of a movement of the valve member off its seat in response to lubricant pressure introduced between the seating surface of the valve member and the seat.

The annular flange 22 cooperates with the opposed cylindrical wall 27 of the valve stem 16 to form a packing chamber or stuffing box, and within this space thus afforded I introduce a compressible or resilient packing 28. This packing may be formed of asbestos or of other suitable packing material of sufficient expansion strength to cause the valve member to maintain its seat under normal conditions when said packing is compressed. The packing, it will be observed, engages the surface 25, and, by virtue of the overlapping between the tongue 23 and the groove 24, said packing, when compressed, cannot escape laterally from the stuffing box.

Pressing on the packing 28, I provide a gland 29 having an annular flange 30 projecting into the stuffing box and formed with an inclined under surface 31 which engages the packing. The gland 29 is provided with an annular flange 32 through which stud bolts 33 extend, retaining nuts 34 engaging said bolts and being held against accidental movement by conventional spring washers 35.

In order to form a limit stop for the plug valve member, so that the same will be limited in motion to a quarter turn, I provide an arcuate recess 36 in a portion of the valve stem 16, and a stop lug 36a on the gland 29 projects into said recess, thus limiting the movement of the valve member to predetermined angular displacement.

It will be understood that the alignment of the bolts 19 in the flange 20 and the relationship of the threaded openings for receiving the bolts 33 passing through the flange of the gland 32 is such that the relationship of the stop member 36a is maintained constant no matter how many times the valve may be repacked. That is, the absence of threads on the gland or on the valve retaining member 21, insures the proper and accurate reassembly of the valve, this being accomplished by the alignment of the openings to receive the bolts 19 and 33, it being unnecessary for an operator to adjust any lock nuts or other devices to insure that the stop member is in the proper position for causing the grooves in the seating surface of the valve member and seat to properly align when in full open and full closed positions. This is a relatively important feature of the invention in that without such an arrangement an operator would have difficulty in reassembling the valve to get the stop member in the proper position to cause the communication to be established between certain of the grooves at the proper positions of the valve member, that is, substantially full open or substantially full closed positions.

While the lubricating of the valve of this invention may be accomplished in a number of ways, I find that, for my purpose, here, the arrangement of grooves disclosed will distribute the lubricant over the seating surface rapidly and completely and without the necessity of opening and closing the valve in order to reach the entire seating surface thereof with lubricant.

To this end I provide in the seating surface of the valve member 17 the longitudinal external grooves 37 and 38, the same being located diametrically opposite to each other and so arranged that when the valve member is in its full-open or full-closed position neither of said grooves comes into contact with the fluid passing through the passageway 11. The location of these grooves can best be seen from an inspection of Figure 2 wherein the valve member is shown in its closed position. It will be understood that when the valve member is in open position the transverse passage-way 39 therein will be brought into registration with the openings 6 and 7, and thus establish flow through the valve. However, as the valve member is moved through but 90 degrees, neither of the passageways 37 or 38 will come in contact with the fluid flowing through the valve, but are always adjacent to the seating surface 8.

The groove 37 at one end communicates with a circumferential groove 40 near the larger end of the plug and outside of the zone of the openings 6 and 7. This groove 40 extends completely around the valve seating surface, but is non-continuous, that is, terminates at the points 41 and 42 which are laterally deflected and overlap, so the grease or other lubricant contents thereof will be distributed over a relatively large area of the valve seat at this point. Furthermore, these deflected portions serve for lapping the valve and give a larger area for this purpose than when the grooves are made continuous. The groove 40 is broken at diametrically opposite points, as will be readily seen from an inspection and comparison of Figures 1 and 4, the deflected portions 41a and 42a being substantially diametrically opposite to those indicated at 41 and 42. The groove 40 is in communication with the lubricant chamber 43 located in the valve stem 16 by the provision of radial passageways, of which there may be two or more, indicated at 44 and 44a, and at the bottom of the lubricant chamber 43, I provide a check valve 45 which prevents reflux of lubricant into the chamber 43, and a compressor screw 46 serves to compress lubricant in the chamber 43 and also in the groove system for lifting the valve member from its seat when desired. It will be observed that the groove 38 communicates with the other half portion of the groove 40, as will be seen from Figure 4.

The opposite ends of the grooves 37 and 38, that is, at the small end of the valve member, are in communication with a supplemental circumferential groove 47, which is interrupted as indicated at 48 and 49 (Figures 1 and 4) and perform a function similar to the groove 40.

At a 90-degree angle on the seating surface of the valve member 17 with respect to the grooves 37 and 38, I provide closed grooves 50 and 51 which, when the valve member is moved from one position to another, that is, from open to closed position, must come in contact with the fluid contents of the line. However, as these grooves contain a relatively small portion of the lubricant in the whole system, the washing out of this lubricant does not materially hinder the successful operation of the valve, especially in that these grooves are immediately refilled with lubricant when the valve member completes its turn to full-open or full-closed position. When the valve member is moved from full-open to full-closed position, or vice versa, the grooves 50 and 51 are disconnected from communication with any of the other grooves, and it is only when in the full-open or full-closed position that the grooves 50 and 51 are in communication with the grooves 40 and 47.

In order to establish communication between the closed grooves 50 and 51 and the circumferential grooves 40 and 47 when the valve member is in full-open or full-closed position, I provide, in alignment with the groove 40, a pair of short connecting grooves 52 and 53, and in alignment with the groove 47 a pair of connecting grooves 54 and 55 in the valve seat. The grooves 52 and 53 are diametrically opposite to each other, but so located that when the valve member is in, say, the closed position, as shown in Figure 1, communication will be established between the groove 55, groove 51 and groove 47, and, similarly, communication will be established between the groove 54, groove 47 and groove 50.

When the valve member is moved 90° to open position, then the diametrically oppositely arranged grooves 52 and 53 at the larger end of the valve member will establish communication, at the upper end of the groove 51, with the groove 40 and concurrently establish communication between the adjacent end of the groove 50 and the groove 40 so that, while the grooves 50 and 51 may become washed out as they move from the full-open and full-closed positions of the valve member, they are replenished with lubricant rapidly from said grooves 40 or 47, in the one instance from the bottom, and in the other instance from the top, and, in this way, will be kept substantially continuously replenished with lubricant.

In the intermediate positions of the valve member between full-open and full-closed positions where the grooves 50 and 51 might be exposed for a considerable period of time to the liquid or gas flowing through the valve, these grooves are maintained out of communication with the lubricant passageways so that none of the fluid or gas in the line can reach the other parts of the lubricating system in any of the grooves 37, 38, 40 or 47.

It will also be understood that in the combined functions of the grooves and the resilient packing, the latter tending to keep the valve member on its seat, and the former being all in communication only when in full-open or full-closed position of the valve member, a relatively thin and uniform coating or layer of lubricant is thus substantially immediately spread over the engaging surfaces of the valve member and its seat, when pressure is applied to the lubricant thereby rendering unnecessary any rotation of the valve member back and forth for producing such spreading of the lubricant as has heretofore been required in valves of this type.

The valve structure provided in this invention permits of the establishment rapidly and without substantial break of a film of lubricant over substantially the entire seating surface of the valve member and its seat so that in valves of relatively large size, wherein lubricant does not, by other types of lubricating means known to me, reach all of the relatively moving surfaces of the valve member and its seat, these surfaces in the present arrangement are adequately lubricated at all times. This will be particularly noted in the arrangement of the circumferential grooves with respect to the longitudinal grooves, wherein, in the one instance, the latter grooves receive lubricant from one end of the valve member, and, in another position of the valve member, receive lubricant from the other end. Furthermore, sufficient lubricant will reach the surfaces of contact between the valve member and its seat at the larger end so that this lubricant may work itself to a point between the larger end surface of the valve member and the valve-retaining plate so as to reduce friction at this point. Furthermore, one of the features of the invention pointed out above, and which simplifies the assembly of the valve, is the relatively fixed arrangement of the stop member 36a and bolts 19 and 33 so that an operator, in assembling the valve, cannot fail to bring the proper grooves into proper alignment for lubricating purposes, as set forth.

By the expression "grooves in the seating surface of the valve member and its seat", appearing throughout the specification and claims, is intended an arrangement of grooves either wholly in the valve member or partly in the valve member and in its seat, for the purpose specified.

Referring now more particularly to the form of invention shown in Figure 6, I provide a valve casing 60 formed with a passageway 61 for the flow of fluid, said casing being further provided with a bore transversely of the passageway 61 and forming a valve seat 62.

The bore forming the valve seat 62 is tapered similarly to the valve seat hereinbefore referred to in Figures 1 to 5. In this form of the invention, the smaller end of the valve seat is terminated beyond the axis of the passageway 61 and the casing 60 is formed with an integral closing wall 63 spaced from the valve member to form a chamber 64.

In the opposite end of the bore forming the valve seat 62, that is the larger end thereof, is open and this part of the casing indicated at 65 is provided with an annular flange 66 suitably apertured as at 67 to receive retaining bolts 68.

A valve member 69 generally tapering in configuration is adapted to engage the seat 62 and is provided with a hole 70 adapted to be brought into registration with the passageway 61.

The valve member 69 is provided with a reduced extension from the larger end thereof forming a valve stem 71 which extends beyond the open end of the valve seat.

The extension 71 is provided with a chamber 72 adapted to contain lubricant and a threaded cap screw 73 is provided for placing the lubricant in the chamber 72 under pressure.

The bottom of the chamber 72, that is the inner end thereof, is placed in communication with a plurality of grooves 73, 74 and 75 in the contacting surfaces of the valve and its seat and are here shown partly in the valve member and partly in the valve seat. A check valve 76 prevents back flow of lubricant from the passageway 74, 75 and thus serves to retain the lubricant under pressure which is introduced into said passageways.

The upper end of the valve seat or bore forming said seat is in part closed by the valve member and this member is retained in position by the provision of an annular plate member 77, the bolts 68 passing through apertures in said plate member indicated at 67A, said annular plate member having the opening therein threaded as at 78 to receive an externally threaded packing gland member 79 which is annular in form and surrounds the stem 71. This packing gland is provided with radial wings 80 spaced apart a convenient distance to accommodate a tool for imparting rotation to the gland. The recesses between the wings 80 are provided with shoulders 81 against which such a tool may abut.

The plate 77 is provided with an internal annular flange 82 which is adapted to engage in a complemental annular recess 83 formed in the larger end surface 84 of the plug valve member and spaced from the external periphery thereof. This flange 82 cooperates with the face 84 and the adjacent wall of the stem 71 to form a packing receiving chamber in which packing 85 resilient in nature is deposited. On top of the packing I place a thrust ring 86 which is adapted to engage said packing 85 and receive the thrust of the gland 79.

It will be observed that there is sufficient space allowed between the annular inner surface of the flange 82 and the bottom or inner surface of the channel 83 to permit of slight upward movement of the valve member off its seat in response to lubricant under pressure introduced between the seating surfaces of the valve member and its seat.

In order to form a limit stop for the turning valve member, the valve member is provided with an annular abutment 87 and this abutment is recessed as at 88 to receive a stop member 89 carried by the inner surface of the annular retaining plate 77.

The packing 85 may be renewed as desired and in order to prevent leakage of the valve and to permit such renewal when the valve is under pressure in a top line, I provide a cap screw 90 projecting through a threaded opening 91 in the wall 63 and adapted to threadingly engage a suitable aperture in the smaller end of the plug valve member as indicated at 92. By tightening the cap screw 90, the plug can be pulled in upon its seat and thus prevent it from leaking during a renewal of the packing at the other end of the plug. Normally, the opening 91 is closed by a suitable plug member indicated at 93.

Having thus described my invention and illustrated its use, what I claim as new and desire to secure by Letters Patent is:

1. In a valve structure, in combination, a casing having a valve seat and valve member engaging said seat and having a transverse fluid passageway, a lubricant chamber in said valve structure, a plurality of interrupted circumferential grooves in the seating surface of one of said members, said grooves being in communication with said lubricant chamber, longitudinal grooves in said seating surface, said grooves terminating short of communication with said interrupted circumferential grooves, and means for establishing communication between said longitudinal and interrupted circumferential grooves, said grooves forming, when in communication, a non-continuous passageway for lubricant around said transverse passageway.

2. In a valve structure, in combination, a casing having a valve seat, a valve member engaging said seat and having a transverse fluid passageway, a lubricant chamber in said valve structure, the seating surface of one of said members having a plurality of interrupted circumferential grooves in communication with said lubricant chamber, said valve structure also having a plurality of longitudinal grooves in the circumferentially grooved seating surface, and grooves in the seating surface of the other member for establishing communication between said grooves in predetermined positions of the valve member for forming a non-continuous passageway around the transverse passageway.

3. A valve structure comprising a casing having a passageway for fluid therethrough and a tapered valve seat formed transversely of the passageway, a tapered valve member seated in the valve seat and having a hole adapted to register with the passageway, longitudinal and transverse grooves in the seating surface of one of said members arranged to form when the valve member is in its open and closed positions an interrupted groove around said hole, a reservoir for containing lubricant, connections between the reservoir and all the grooves when the valve member is in substantially full-open and closed positions, and means for applying pressure to the lubricant.

4. A plug valve comprising a casing having a passageway for fluid therethrough, and a tapered valve seat formed transversely of the passageway, a tapered valve member seated in the valve seat and having a hole adapted to register with said passageway, longitudinal and transverse grooves located in the seating surface of one of said members and arranged to form when the valve member is in its open and closed positions an interrupted groove around said hole, a reservoir for containing a lubricant, connections between the reservoir and all the grooves when the valve member is in substantially full-open or full-closed positions, means for applying pressure to the lubricant, and auxiliary means for retaining said lubricant under pressure.

5. A valve comprising a casing having a passageway for fluid therethrough and a tapered valve seat formed transversely of the passageway, a tapered valve member seated in the valve seat and having a hole adapted to register with the passageway, longitudinal and transverse grooves in the seating surface of one of said members arranged to form when the valve member is in its open and closed positions an interrupted groove around said hole, one of the longitudinal grooves being disconnected from the transverse grooves when the valve member is in any position other than substantially full-open or closed positions, a reservoir for containing lubricant, connections between the reservoir and said grooves, and means for applying pressure to the lubricant for forcing the same into said grooves.

6. A valve structure comprising a casing having a passageway and tapered valve seat formed transversely of the passageway, a tapered plug valve member seated in the valve seat and having a hole adapted to register with the passageway, a lubricant chamber in said valve structure, longitudinal and circumferential grooves in the seating surface of one of said members, said circumferential grooves being non-continuous and substantially surrounding said plug, a pair of said longitudinal grooves being out of communication with the circumferential grooves except when the valve member is in its full open or closed positions, and grooves in the seating surface of the other member for establishing communication between said longitudinal grooves and said circumferential grooves.

7. A valve structure comprising a casing having a passageway and tapered valve seat formed transversely of the passageway, a tapered plug valve member seated in the valve seat and having a hole adapted to register with the passageway, a lubricant chamber in said valve structure, longitudinal and circumferential grooves in the seating surface of one of said members, said circumferential grooves being non-continuous, a pair of said longitudinal grooves being out of communication with the circumferential grooves except when the valve member is in its full open or closed positions, and grooves in the seating surface of the other member for establishing communication between said longitudinal grooves and said circumferential grooves, the last-named grooves establishing communication with the complemental longitudinal grooves around the seating surfaces alternately at opposite ends of said longitudinal grooves.

8. A valve comprising a casing having a passageway for fluid therethrough and a tapered valve seat formed transversely of the passageway, a tapered valve member seated in the valve seat and having a hole adapted to register with the passageway, longitudinal and transverse grooves in the seating surface of one of said members arranged to form when the valve member is in its open and closed positions an interrupted groove around said hole, the ends of said transverse groove being deflected and in overlapping relationship, a reservoir for containing plastic substance, connections between the reservoir and all the grooves when the valve member is in substantially full-open and closed positions, and means for applying pressure to the plastic substance.

9. A valve structure comprising a casing having a passageway and tapered valve seat formed transversely of the passageway, a tapered plug valve member seated in the valve seat and having a hole adapted to register with the passageway, a reservoir for lubricant in said valve structure, longitudinal and circumferential grooves in the seating surface of one of said members, said circumferential grooves being non-continuous, but having adjacent ends deflected and in overlapping relationship, a pair of said longitudinal grooves being out of communication with the circumferential grooves except when the valve member is in its full open or closed positions, and grooves in the seating surface of the other member for establishing communication between said longitudinal grooves and said circumferential grooves when in such open and closed positions.

10. In a valve structure, in combination, a casing having a valve seat, a valve member engaging said seat, and having a transverse fluid passageway, a lubricant chamber in said valve structure, a plurality of interrupted circumferential grooves in the seating surface of one of said members, located near the ends thereof, a plurality of longitudinal grooves in said seating surface on each side of said transverse fluid passageway, one of said longitudinal grooves being disconnected from the circumferential grooves, and grooves in the seating surface of the other member for establishing communication between said disconnected circumferential and longitudinal grooves.

11. In a valve structure, in combination, a casing having a valve seat, a valve member engaging said seat and having a transverse fluid passageway, a lubricant chamber in said valve structure, a plurality of interrupted circumferential grooves in the seating surface of one of said members, and in communication with said lubricant chamber, longitudinal grooves in said seating surface, means for establishing communication between said longitudinal and circumferential grooves, and a compressible packing seating on one end of said valve member.

12. A valve comprising a casing having a passageway for fluid therethrough and a tapered valve seat formed transversely of the passageway, a tapered valve member seated in the valve seat and having a hole adapted to register with the passageway, longitudinal and transverse grooves in the seating surface of one of said members arranged to form when the valve member is in its open and closed positions an interrupted groove around said hole, a reservoir for containing plastic substance, connections between the reservoir and all the grooves when the valve member is in substantially full-open and closed positions, said grooves being so located that communication between certain of the longitudinal grooves and the reservoir is discontinued when exposed to fluid in said fluid passageway, and means for applying pressure to the plastic substance.

13. A valve comprising a casing having a passageway for fluid therethrough and a tapered valve seat formed transversely of the passageway, a tapered valve member seated in the valve seat and having a hole adapted to register with the passageway, longitudinal and transverse grooves in the seating surface of one of said members arranged to form when the valve member is in its open and closed positions an interrupted groove around said hole, a reservoir for containing plastic substance, connections between the reservoir and all the grooves when the valve member is in substantially full-open and closed positions, means for applying pressure to the substance in the reservoir and said grooves for lifting the valve member from its seat, and means for resisting the lift of the valve member comprising a compressible resilient packing which returns the valve member to its seat and thereby prevents leakage.

14. A valve structure comprising a casing having a passageway and a tapered valve seat formed transversely of the passageway, a tapered plug valve member seated in the valve seat and having a hole adapted to register with the passageway, a lubricant chamber in said valve structure, longitudinal and circumferential grooves in the seating surface of one of said members, said circumferential grooves being non-continuous and substantially surrounding said plug, a pair of said longitudinal grooves being out of communication with the circumferential grooves except when the valve member is in its full open or closed positions, means for placing the lubricant under pressure in said chamber, and grooves in the valve seat for establishing communication between said longitudinal grooves and said circumferential grooves only when said valve plug member is in either full-open or full-closed position.

15. In a valve structure, in combination, a casing having a tapered valve seat, a tapered valve member engaging said seat and having a transverse fluid passageway, a lubricant chamber in said valve structure, a plurality of interrupted circumferential grooves in the seating surface of one of said members, and in communication with said lubricant chamber, means for placing the lubricant in said chamber under pressure for forcing it into said grooves, longitudinal grooves in said seating surface, means for establishing communication between said longitudinal and said circumferential grooves, said lubricant when placed under pressure tending to lift said valve member from its seat, said valve member having an operating stem projecting from one end thereof, a packing surrounding said stem and abutting one end of said valve member, said packing being resilient and tending to hold said valve member on its seat, said lubricant when placed under pressure by said means in said lubricant chamber moving the valve member from its seat by the pressure of said lubricant, said grooves cooperating upon such movement of the valve member against the tension of said packing to cause the lubricant to be distributed about the seating surfaces of the valve.

16. In a valve structure, in combination, a casing having a tapered valve seat, a tapered valve member engaging said seat and having a transverse fluid passageway, a lubricant chamber in said valve structure, a plurality of interrupted circumferential grooves in the seating surface of one of said members, and in communication with said lubricant chamber, means for placing the lubricant in said chamber under pressure for forcing it into said grooves, longitudinal grooves in said seating surface, means for establishing communication between said longitudinal and said circumferential grooves, said lubricant when placed under pressure tending to lift said valve member from its seat, said valve member having an operating stem projecting from one end thereof, a packing surrounding said stem and abutting one end of said valve member, said packing being resilient and tending to hold said valve member on its seat, said lubricant when placed under pressure by said means in said lubricant chamber moving the valve member from its seat by the pressure of said lubricant, said grooves cooperating upon such movement of the valve member against the tension of said packing to cause the lubricant to be distributed about the seating surfaces of the valve member and the casing, and means interposed between said lubricant chamber and said grooves including a check valve for maintaining the lubricant under pressure at the seating surfaces and in said grooves irrespective of the pressure in said lubricant chamber.

17. In a plug valve, a casing having a tapered valve seat and a tapered valve member adapted to engage said seat and provided with an operating stem extending beyond the casing, said casing having fluid passageways and a passageway in said valve member for controlling the flow of fluid therethrough, a valve retaining plate bolted to said casing and adapted to lie in the path of axial movement of said valve member, a packing supported between the valve retaining member and said stem and engaging one end of the valve member to form a fluid-tight joint, a packing gland bolted to said valve retaining member, said gland being retained in a predetermined position with relation to said fluid passageways in said casing and provided with a stop member adapted to engage in a recess in said operating stem for limiting the rotative movement of said valve member, the seating surface of said valve member and its seat being provided with a plurality of interrupted circumferential grooves and longitudinal grooves independent thereof which are adapted to be brought into communication only when said valve member is in substantially full-open or substantially full-closed position, means for placing the lubricant therein under pressure, and said stop member being so located as to prevent rotative movement of said valve member beyond a predetermined degree of full-open and full-closed position.

18. In a plug valve, a casing having a tapered valve seat and a tapered valve member adapted to engage said seat and provided with an operating stem extending beyond the casing, said casing having fluid passageways and a passageway in said valve member for controlling the flow of fluid therethrough, a valve retaining plate bolted to said casing and adapted to lie in the path of axial movement of said valve member, a packing supported between the valve retaining member and said stem and engaging one end of the valve member to form a fluid-tight joint, a packing gland bolted to said valve retaining member, said gland being retained in a predetermined position with relation to said fluid passageways in said casing and provided with a stop member adapted to engage in a recess in said operating stem for limiting the rotative movement of said valve member, the seating surface of said valve member and its seat being provided with a plurality of interrupted circumferential grooves and longitudinal grooves independent thereof which are adapted to be brought into communication only when said valve member is in substantially full-open or substantially full-closed position, means for placing the lubricant therein under pressure, and said stop member being so located as to prevent rotative movement of said valve member beyond a predetermined degree of full-open and full-closed position, the location of the bolts in said gland and valve-retaining member being such that a fixed relationship of the stop member with respect to the grooves in the seating surface will be maintained for facilitating assembling of the device.

19. In a lubricated and sealed cock, a body member having a passage therethrough and a valve chamber transverse to said passage, a plug member seated in said chamber and means for lubricating said cock comprising diametrically opposite lubricant grooves in the seating surface of one of said members and substantially surrounding the passage through the body at each end of the body, means for supplying lubricant under pressure to each of said grooves, said means for preventing communication through said grooves from one to the other.

20. In a lubricated and sealed cock, a body member having a passage therethrough and a valve chamber transverse to said passage, a plug member seated in said chamber and means for lubricating said cock comprising diametrically opposite lubricant grooves in the seating surface of one of said members and substantially surrounding the passage through the body at each end of the body, means for supplying lubricant under pressure to each of said grooves, and means for preventing communication through said grooves from one to the other at any position of the plug.

21. In a lubricated and sealed cock, a body member having a passage therethrough and a valve chamber transverse to said passage, a plug member seated in said chamber and means for lubricating said cock comprising a circumferential lubricant groove in the seating surface of one of said members and substantially surrounding said plug, said groove being interrupted, and a longitudinal lubricant groove in the seating surface of one of said members at each side of the passage through said body at one end of the body, said longitudinal grooves communicating with said circumferential groove, and means for supplying lubricant under pressure to all of said grooves.

22. In a lubricated and sealed cock, a body member having a passage therethrough and a valve chamber transverse to said passage, a plug member seated in said chamber, and means for lubricating said cock comprising diametrically opposite circumferential lubricant grooves in the seating surface of one of said members and terminating in spaced non-communicating overlapping ends, a longitudinal lubricant groove in the seating surface of one of said members at each side of said passage at one end of the body, said longitudinal grooves communicating with one of said circumferential grooves, and means for supplying lubricant under pressure to all of said grooves.

23. In a lubricated and sealed cock, a body member having a passage therethrough and a valve chamber transverse to said passage, a plug member seated in said chamber, and means for lubricating said cock comprising diametrically opposite lubricant grooves in the seating surface of one of said members extending circumferentially of said plug and terminating in spaced non-communicating ends, a longitudinal lubricant groove in the seating surface of one of said members at each side of the passage through said body at each end of the body, said longitudinal grooves each communicating with one of said circumferential grooves, and means for supplying lubricant under pressure to all of said grooves.

24. In a lubricated and sealed cock, a body member having a passage therethrough and a valve chamber transverse to said passage, a plug member seated in said chamber, and means for lubricating said cock comprising a circumferential lubricant groove in the seating surface of one of said members and substantially surrounding said plug, said groove being interrupted at diametrically opposite points, a longitudinal lubricant groove in the seating surface of one of said members at each side of the passage through said body at one end of said body, said longitudinal grooves communicating with said circumferential groove, and means for supplying lubricant under pressure to all of said grooves.

25. In a lubricated and sealed cock, a body having a passage therethrough and a valve chamber transverse to said passage, a plug seated in said chamber, and means for lubricating the seating surfaces of said plug and body including a lubricant groove substantially surrounding the upper portion of said plug and longitudinal lubricating grooves communicating therewith to substantially surround the passage through the body at each end of the body, means for preventing communication through said grooves between the grooves surrounding the passage at one end of the body and the grooves surrounding the passage at the other end of the body, and means for supplying said grooves with lubricant under pressure.

26. In a lubricated and sealed cock, a body having a passage therethrough and a valve chamber transverse to said passage, a plug seated in said chamber, and means for lubricating the seating surfaces of said plug and body including a groove substantially surrounding the upper portion of said plug and a pair of connected longitudinal grooves cooperating therewith to substantially surround the passage through the body at each end of the body, one end of one of the longitudinal grooves of each pair being in communication with said circumferential groove and the free end of the other of said longitudinal grooves of each pair being disconnected therefrom, means for preventing communication through said grooves between the grooves substantially surrounding the passage at one end of the body and the grooves substantially surrounding the passage at the other end of said body, and means for supplying said grooves with lubricant under pressure.

27. In a lubricated and sealed cock, a body member having a passage therethrough and a valve chamber transverse to said passage, a plug member seated in said chamber, and means for lubricating the seating surfaces of said plug and body members including two diametrically opposite non-communicating lubricant grooves substantially surrounding the upper portion of said plug, additional lubricant grooves at each end of the body one in communication with each of said diametrically opposite grooves and cooperating therewith to substantially surround the passage through the body, a lubricant reservoir in the plug and lateral ducts extending therefrom, one to each of said circumferential grooves, and means for preventing each of said ducts from communicating with the other of said circumferential grooves through said lubricant grooves.

28. In a lubricated and sealed cock, a body member having a passage therethrough and a valve chamber transverse to said passage, a plug member seated in said chamber and means for lubricating said cock comprising diametrically opposite lubricant grooves in the seating surface of one of said members and substantially surrounding the passage through the body at each end of the body, said grooves terminating in closed non-communicating ends to prevent circulation therethrough.

29. In a lubricated and sealed cock, a body member having a passage therethrough and a valve chamber transverse to said passage, a plug member seated in said chamber and means for lubricating the seating surfaces of said plug and body members including a circumferential lubricant groove in the seating surface of one of said members and having deflected portions extending in opposite directions from said groove, a lubricant reservoir formed in said plug and a duct therefrom communicating with said circumferential groove.

30. In a lubricated and sealed cock, a body member having a passage therethrough and a valve chamber transverse to said passage, a plug member seated in said chamber, and means for lubricating the seating surfaces of said plug and body members including two circumferential grooves in one of said members and surrounding the upper and lower portions of said plug, said grooves each having diametrically opposite deflected portions, additional grooves in communication with each of said circumferential grooves at one end only of said additional grooves and cooperating therewith to substantially surround the passage through the body at each end thereof, a lubricant reservoir in the plug, and lateral ducts extending therefrom, one to each of said circumferential grooves, being in communication with said circumferential grooves at all positions of said plug.

31. In a lubricated sealed cock, a body having a passage therethrough and a valve chamber transverse to said passage and provided with a seating surface, a plug seated in said chamber and provided with a cooperating seating surface, and means for lubricating said cock comprising diametrically opposite lubricant grooves in one of said seating surfaces and substantially surrounding the pasage through the body at each end of the body, means for supplying lubricant under pressure to each of said grooves, and means for preventing communication through said grooves from one to the other.

32. In a lubricated and sealed cock, a body member having a passage therethrough and a valve chamber transverse to said passage, a plug member seated in said chamber and means for lubricating the seating surfaces of said plug and body members including an interrupted lubricant groove in the seating surface of one of said members and substantially surrounding the upper portion of the other member, a lubricant reservoir formed in said plug, and a duct therefrom communicating with said circumferential groove in all positions of said plug.

33. In a valve structure, a body member having a passage therethrough and a valve chamber transverse to said passage, a valve member seated in said chamber, and means for lubricating and sealing the seating surfaces of said valve and body members including circumferential lubricant grooves in said seating surfaces extending above and below said passage, said grooves each having deflected portions extending in opposite directions from said grooves, longitudinal lubricant grooves in said surfaces adapted to cooperate with said circumferential grooves to form a frame around the passage when the valve is in closed position, and a lubricant reservoir in said valve for supplying lubricant to said grooves.

34. In a valve structure, a body member having a passage therethrough and a valve chamber transverse to said passage, a valve member seated in said chamber, a stem projecting from said valve member and defining a shoulder portion on said valve member, a flange secured to the body and having a portion overlying said shoulder portion, one of said portions having a groove, and a tongue on the other said portion cooperating with said groove for minimizing leakage of the valve.

35. In a valve structure, a body member having a passage therethrough and a valve chamber transverse to said passage, a valve member seated in said chamber, a stem projecting from said valve member and defining a shoulder on said valve member, a packing around said stem and seated on said shoulder, a flange secured to the body having a portion engaging said packing and overlying the remaining portion of said shoulder, one of said portions having an annular groove, and a tongue on the other said portion received within said groove for minimizing leakage of the valve.

FRANCIS NORWOOD BARD.